Dec. 4, 1956          R. L. WILLS          2,772,719
METHOD OF WELDING RUBBER ARTICLES
Filed July 9, 1954
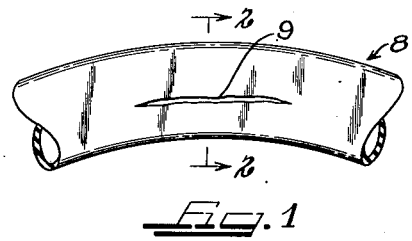
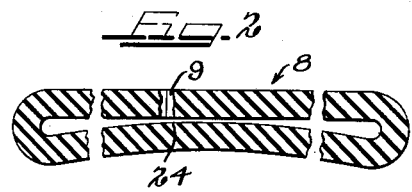
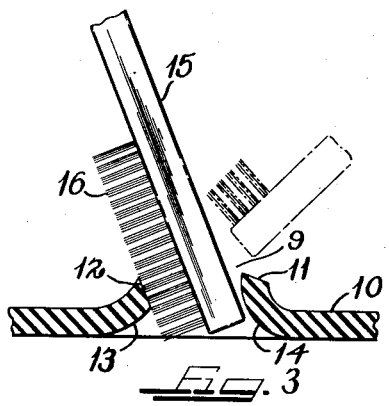
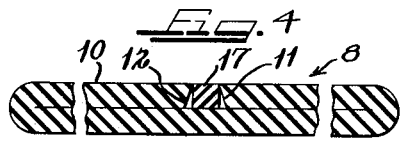
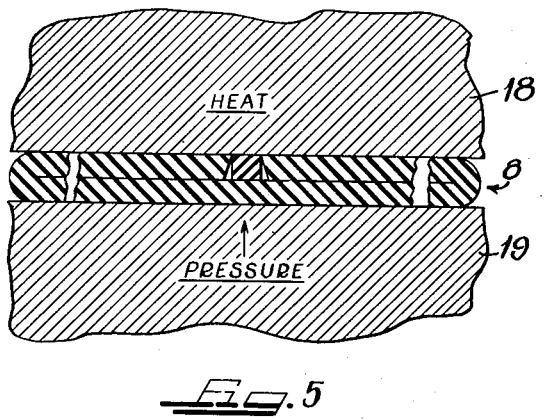
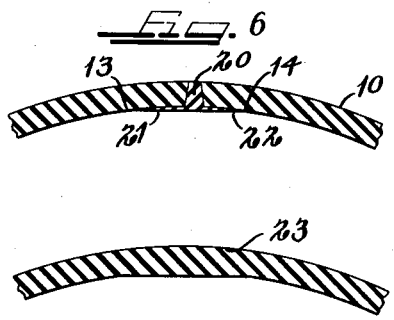
Inventor
ROBERT L. WILLS
Attorney United States Patent Office 2,772,719
Patented Dec. 4, 1956

2,772,719

METHOD OF WELDING RUBBER ARTICLES

Robert L. Wills, Blue Island, Ill.

Application July 9, 1954, Serial No. 442,403

9 Claims. (Cl. 154—14)

My invention relates to a method of securing, or welding, sheet materials such as sheet rubber and rubber compositions, for the welding or vulcanizing of blowouts, and for making blowout repairs on tire tubes used for trucks, aircraft and heavy duty purposes. However, it may also be employed for the repair of any other sheet rubber articles or tire tubes.

It is an important object of my invention to provide an improved method for welding sheet rubber articles wherein the edges to be joined are first buffed, then rubber cement is applied thereto and subsequently a piece of tube gum is placed between the edges to be joined, the edges being primarily bevelled so as to permit the tube gum when pressure and heat are applied to the juncture forming the seam for the said tube gum to be resolved by a swaging action into an inverted T formation, the bevelling of the edges aiding and initiating the inverted T formation.

Another object of my invention is to provide an improved method of joining edges of sheet rubber-like articles, wherein the said edges are buffed and the areas below the said edges are also buffed, the edges and the buffed areas then having rubber cement applied thereto, and then positioned with a piece of tube gum therebetween of the same thickness as the thickness of the sheet rubber article, the edges being bevelled downwardly, so as to aid in initiating the base of the inverted T-like formation to which the tube gum rubber is resolved subsequent to the application of heat and pressure, thus forming a secure bond.

A still further object of my invention is to provide an improved method of welding or vulcanizing sheet rubber articles in which the edges to be joined are buffed as well as the areas immediately therebelow and adjacent thereto. In the buffing operation, the edges are preferably bevelled downwardly toward the bottom areas which are also buffed, a suitable cleaner may then also be employed in order to make sure that the buffed surfaces are absolutely clean, then rubber cement is applied to the buffed edges, and ultimately a piece of tube gum of the same thickness and of suitable width is assembled between the edges to be welded or vulcanized, subsequently applying heat and pressure which initiate the alteration of the configuration without altering the volume of the tube gum, so as to form an inverted T bond between the buffed edges and the buffed areas therebelow.

A still further object of my invention is to provide an improved method of welding sheet rubber and the like articles, which can be performed by unskilled labor without requiring special training, and with equipment which will aid in the application of heat and pressure.

Other objects and advantages inherent in my invention will become apparent from an examination of the accompanying drawings which bear further elucidation in the ensuing description in which like numerals are used to designate like parts, and in which;

Fig. 1 is an elevational view of a section of a tire tube having an opening or rip, resulting from a blowout which is to be repaired.

Fig. 2 is a transverse cross-sectional view taken, substantially, on the lines 2—2 of Fig. 1.

Fig. 3 is an enlarged view of the edges to be welded or vulcanized, showing the method of buffing the same with a wire brush or like instrumentality.

Fig. 4 is a cross-sectional view similar to Fig. 2, showing the buffed edges and the tube gum element placed therebetween preparatory to the welding or vulcanizing operation.

Fig. 5 shows the final step in the vulcanizing or rubber welding process where heat and pressure are simultaneously applied.

Fig. 6 is a cross-sectional view showing the edges, and the shape of the inverted T formation of the tube gum, after heat and pressure have been applied and the vulcanizing process is complete.

Fig. 7 is a view similar to Fig. 6 showing the result whereby the cohesion of the tube gum and the edges of the sheet rubber article have completely cohered so as to form a continuous rubber vulcanized joint.

Referring to the various views in Fig. 1, a tire tube generally designated 8 is indicated as having a break 9 which resulted from a tear, puncture or blowout. The opening 9 thus resulting is treated in the following manner as illustrated in Fig. 3, a wire brush 15 having wire or like bristles 16 is utilized for buffing the edges 11 and 12 of the rupture 9 of the sheet-like rubber section 10. The underneath areas 13 and 14 adjacent the edges 11 and 12 are also buffed. A circular buffing wheel subjected to rotary motion may also be employed for this purpose. The surface 24 which is in intimate contact with the bottom surface of the section 10, is not buffed. The next step in the procedure is to set up the tire tube, in this instance, after having slightly bevelled the edges 11 and 12 downwardly, as indicated by assembling therebetween a piece of gum rubber which may be of quadrilateral, or of polygonal formation, or of circular formation, in between the edges 11 and 12 and resting on the surface 24. The tube gum 17 is preferably of the same thickness as the rubber section 10. The assemblage is then placed in a press having a heated platen 18 and a pressure platen 19, the assemblage is then subjected to heat and pressure simultaneously, causing the tube gum 17 to be resolved into the inverted T formation indicated at Fig. 6, whereby the section 20 thereof is shown to be narrower in area than the original area of the cross-sectional area of the tube gum element 17, causing by the forces acting upon it to form the feathered edges 21 and 22 on the underneath and adjacent areas 13 and 14 of the section 10, thus causing a bond on the edges 11 and 12 as well as the under portions 13 and 14. The bonding and the cohesion is so homogeneous as to result in the structure illustrated at 23 in Fig. 7.

The bevelling of the edges 11 and 12 or filleting the bottom edges of the surfaces 13 and 14 may provide the same result, so that when heat and pressure are simultaneously applied the bevelled or filleted edges will initiate the formation of the feather-like bonding portions 21 and 22.

In some instances, in order to make certain that the edges 11 and 12 and the areas 13 and 14 will form a true bond they may be cleaned by using any conventional type of rubber cleaner. However, the bonding is effectuated without necessarily using a bonding cleaner. It has been found that in performing the operation or the steps of my method, that a good bond will result which invariably strengthens the tire tube at the particular point of juncture or at the seam, making it much stronger than the tire tube may be at any other place.

Tire tubes which have rather long rips may be treated sectionally, and one long rip may be repaired by repairing fractional portions thereof successively. The bevelling of the edges causes the edges to be forced toward one another when pressure is exerted, the heat causing the tube gum, originally placed between the edges to be joined, to be narrowed causing the overflow of tube gum to follow the path of least resistance and hence to flow under the buffed areas thus producing feathered sections which cohere to form an inverted T weld as illustrated. The top area 24 of the lower section of the tire tube not having been buffed or cleaned will not cohere to the tube gum. In effect the edges of the tire tube are brought very closely together so that there is practically no distortion of the cross-sectional configuration of the tire tube, the strength of the repair being augmented by the cohesion of the feathered portions cohering to the buffed and/or cleaned areas below the rip.

I believe I have herein illustrated and described the nature of my invention, and expounded, in expository form, the teachings so that those familiar with the art will be able to practice my invention. Inasmuch as the same is susceptible of many modifications, alterations, and improvements, I hereby reserve the right to any improvements, alterations and modifications coming within the scope and spirit of my invention and disclosure, also the right to any improvements impliably embraced in the accompanying illustrations depicting the generally suggested elemental structure of my invention, and also any modifications, improvements, or alterations, falling within the purview of the foregoing description; my invention to be limited only by the subjoined claims.

Having thus described and revealed my invention, what I claim as new and desire to secure by Letters Patent is:

1. The method of welding sheet rubber which consists entirely of buffing opposed edges that are to be joined and areas on the underside of the sheet material adjacent the said edges, applying only one strip of tube gum intermediately the said edges, and vulcanizing the tube gum by the application of heat and pressure simultaneously causing said tube gum to be swaged into an inverted T formation.

2. The method of welding sheet rubber which consists entirely of applying rubber cement to opposed edges that are to be joined and areas on the underside of the sheet material adjacent the said edges, applying only one strip of tube gum intermediately the said edges, and vulcanizing the tube gum by the application of heat and pressure simultaneously causing said tube gum to be swaged into an inverted T formation.

3. The method of welding sheet rubber which consists entirely of buffing opposed edges that are to be joined and areas on the underside of the sheet material adjacent the said edges, applying rubber cement to the buffed areas and edges, applying only one strip of tube gum intermediately the said edges, and vulcanizing the tube gum by the application of heat and pressure simultaneously causing said tube gum to be swaged into an inverted T formation.

4. The method of welding sheet rubber which consists entirely of buffing opposed edges that are to be joined and areas on the underside of the sheet material adjacent the said edges, applying only one strip of tube gum having a thickness approximately equal to the thickness of the sheet and positioning the said strip intermediately the said edges, and vulcanizing the tube gum by the application of heat and pressure simultaneously causing said tube gum to be swaged into an inverted T formation.

5. The method of welding sheet rubber which consists entirely of applying rubber cement to opposed edges that are to be joined and to areas on the underside of the sheet material adjacent the said edges, applying only one strip of tube gum having a thickness approximately equal to the thickness of the sheet and positioning the said strip intermediately the said edges, and vulcanizing the tube gum by the application of heat and pressure simultaneously causing said tube gum to be swaged into an inverted T formation.

6. The method of welding sheet rubber which consists entirely of buffing opposed edges that are to be joined and areas on the underside of the sheet material adjacent the said edges, applying rubber cement to the buffed areas and edges, applying only one strip of tube gum having a thickness approximately equal to the thickness of the sheet and positioning the said strip intermediately the said edges, and vulcanizing the tube gum by the application of heat and pressure simultaneously causing said tube gum to be swaged into an inverted T formation.

7. The method of welding sheet rubber which consists entirely of buffing and bevelling downwardly opposed edges that are to be joined and buffing areas on the underside of the sheet material adjacent the said edges, applying only one strip of tube gum intermediately the said edges, and vulcanizing the tube gum by the application of heat and pressure which simultaneously swages said tube gum, the resulting joint being of inverted T formation including feathered portions cohering to the said buffed areas.

8. The method of welding sheet rubber which consists entirely of applying rubber cement to opposed edges that are to be joined and to areas on the underside of the sheet material adjacent the said edges, applying only one strip of tube gum intermediately the said edges, and vulcanizing the tube gum by the application of heat and pressure which simultaneously swages said tube gum, the resulting joint being of inverted T formation including feathered portions cohering to the said buffed areas.

9. The method of welding sheet rubber which consists entirely of buffing and bevelling downwardly opposed edges that are to be joined and buffing areas on the underside of the sheet material adjacent the said edges, applying rubber cement to the buffed areas and edges, applying only one strip of tube gum intermediately the said edges, and vulcanizing the tube gum by the application of heat and pressure which simultaneously swages said tube gum, the resulting joint being of inverted T formation including feathered portions cohering to the said buffed areas.

References Cited in the file of this patent

UNITED STATES PATENTS

| Number | Name | Date |
|---|---|---|
| 1,591,816 | Hawkinson | July 6, 1926 |
| 1,591,817 | Hawkinson | July 6, 1926 |
| 1,899,676 | Dettling | Feb. 28, 1933 |
| 2,004,037 | Criswell | June 4, 1935 |
| 2,370,958 | Hellier | Mar. 6, 1945 |
| 2,430,076 | Pollock | Nov. 4, 1947 |